(12) United States Patent
Patel et al.

(10) Patent No.: US 8,712,391 B2
(45) Date of Patent: Apr. 29, 2014

(54) CLIENT-MANAGED GROUP COMMUNICATION SESSIONS WITHIN A WIRELESS COMMUNICATIONS SYSTEM

(75) Inventors: Biren R. Patel, San Diego, CA (US); Mark A. Lindner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 13/277,854

(22) Filed: Oct. 20, 2011

(65) Prior Publication Data

US 2012/0149348 A1    Jun. 14, 2012

Related U.S. Application Data

(60) Provisional application No. 61/421,037, filed on Dec. 8, 2010.

(51) Int. Cl.
| | | |
|---|---|---|
| *H04M 3/42* | (2006.01) | |
| *H04B 7/00* | (2006.01) | |
| *H04L 12/16* | (2006.01) | |
| *H04M 11/00* | (2006.01) | |
| *H04M 1/00* | (2006.01) | |
| *H04N 7/14* | (2006.01) | |

(52) U.S. Cl.
USPC ........ 455/416; 455/518; 370/260; 379/93.21; 379/158; 379/202.01; 379/207.01; 348/14.08

(58) Field of Classification Search
CPC ........... H04W 4/06; H04W 4/08; H04W 4/10; H04W 8/186; H04M 3/56; H04M 3/562; H04M 3/566; H04M 3/567; H04L 12/18; H04L 12/1813; H04L 12/1822; H04L 12/1831; H04L 12/185; H04L 51/04; H04L 51/043; H04L 51/046; H04L 65/1063; H04L 65/403; H04L 65/4038; H04L 65/4046; H04L 65/4061; H04L 67/24; H04L 67/104; H04L 67/1044; H04N 7/15
USPC ........ 455/416, 518; 370/260; 379/93.21, 158, 379/202.01–207.01; 348/14.08
See application file for complete search history.

(56) References Cited

U.S. PATENT DOCUMENTS

| | | |
|---|---|---|
| 6,999,783 B2 | 2/2006 | Toyryla et al. |
| 7,251,495 B2 | 7/2007 | Keyani et al. |

(Continued)

FOREIGN PATENT DOCUMENTS

| | | |
|---|---|---|
| EP | 1775985 A1 | 4/2007 |
| GB | 2460897 A | 12/2009 |
| WO | 03039173 A1 | 5/2003 |

OTHER PUBLICATIONS

International Search Report and Written Opinion—PCT/US2011/063991—ISA/EPO—May 24, 2012.

*Primary Examiner* — Vladimir Magloire
*Assistant Examiner* — Michael Mapa
(74) *Attorney, Agent, or Firm* — Raphael Freiwirth

(57) ABSTRACT

In an embodiment, a user equipment (UE) participating in a server-mediated communication session maintains an identifier of the session and a list of UEs that are currently participating in the session. The UE determines to suppress its participation level in the session, and configures a member update message to include the identifier and to indicate the suppressed participation level of the UE. The UE transmits the configured member update message to each other UE currently participating in the session. In another embodiment, the UE receives a request to modify one or more of a given set of control parameters associated with the session. The UE determines whether the UE belongs to a subset of UEs that are currently participating in the session and to which permission to modify the given set of parameters is restricted. The UE selectively grants the received request based on the determination.

49 Claims, 11 Drawing Sheets

(56) References Cited

U.S. PATENT DOCUMENTS

| | | |
|---|---|---|
| 7,774,010 B2 | 8/2010 | Kokkonen et al. |
| 2003/0119540 A1 | 6/2003 | Mathis |
| 2006/0111135 A1 | 5/2006 | Gray et al. |
| 2006/0147009 A1* | 7/2006 | Greenlee et al. ......... 379/202.01 |
| 2006/0194596 A1 | 8/2006 | Deng |
| 2007/0197248 A1* | 8/2007 | Reich et al. ................... 455/518 |
| 2008/0069011 A1* | 3/2008 | Sekaran et al. ............... 370/260 |
| 2008/0133660 A1* | 6/2008 | Salesky et al. ................ 709/204 |
| 2008/0189407 A1* | 8/2008 | Charlton et al. ............. 709/224 |

* cited by examiner

CLIENT-MANAGED GROUP COMMUNICATION SESSIONS WITHIN A WIRELESS COMMUNICATIONS SYSTEM

CLAIM OF PRIORITY UNDER 35 U.S.C. §119

The present Application for Patent claims priority to Provisional Application No. 61/421,037 entitled "CLIENT-MANAGED GROUP COMMUNICATION SESSIONS WITHIN A WIRELESS COMMUNICATIONS SYSTEM", filed Dec. 8, 2010, and assigned to the assignee hereof and hereby expressly incorporated by reference herein.

BACKGROUND

1. Field of the Invention

Embodiments of the invention relate to client-managed group communication sessions within a wireless communications system.

2. Relevant Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal FDMA (OFDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

SUMMARY

In an embodiment, a user equipment (UE) participating in a server-mediated communication session maintains an identifier of the session and a list of UEs that are currently participating in the session. The UE determines to suppress its participation level in the session, and configures a member update message to include the identifier and to indicate the suppressed participation level of the UE. The UE transmits the configured member update message to each other UE currently participating in the session. In another embodiment, the UE receives a request to modify one or more of a given set of control parameters associated with the session. The UE determines whether the UE belongs to a subset of UEs that are currently participating in the session and to which permission to modify the given set of parameters is restricted. The UE selectively grants the received request based on the determination.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
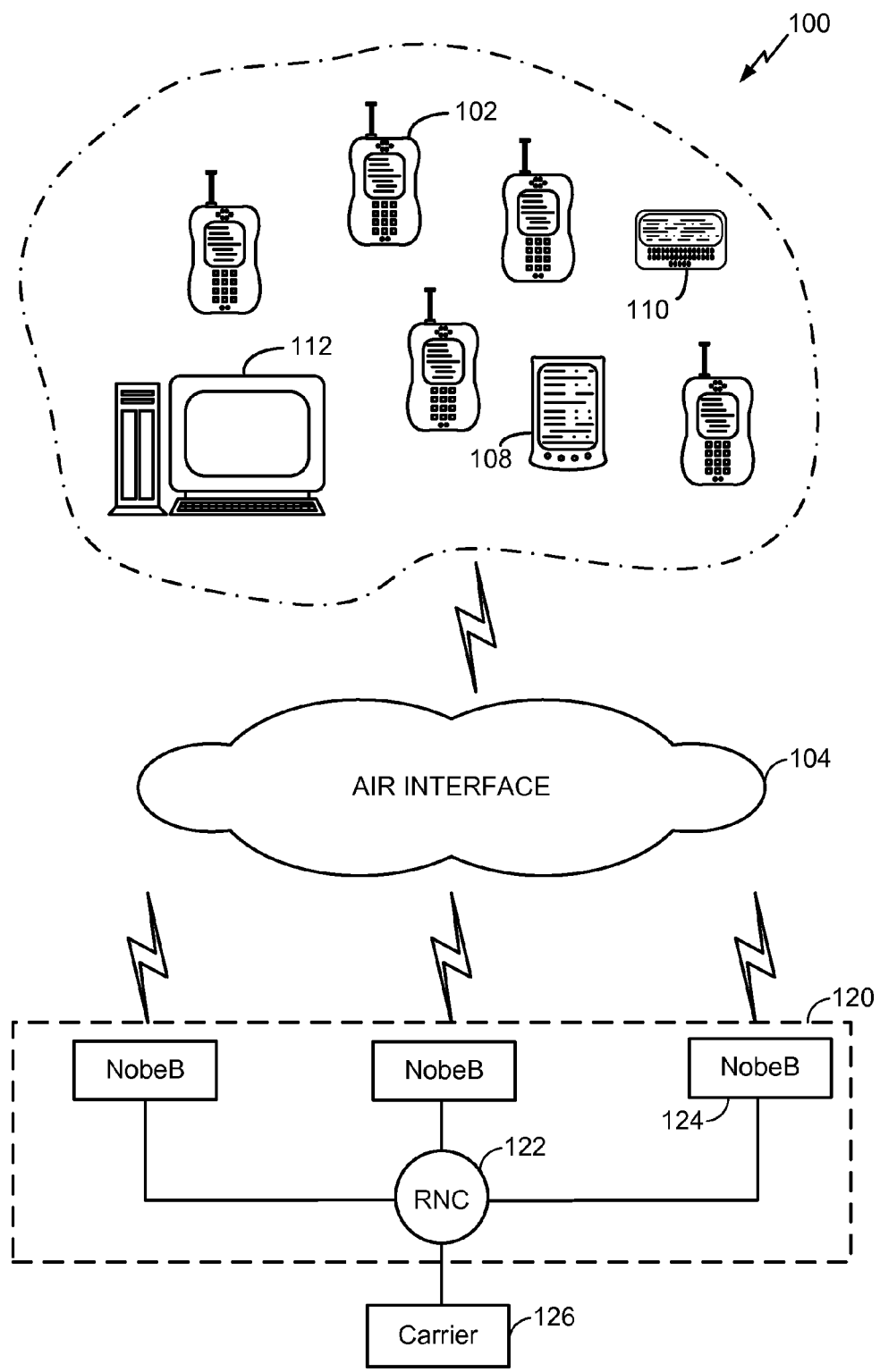
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
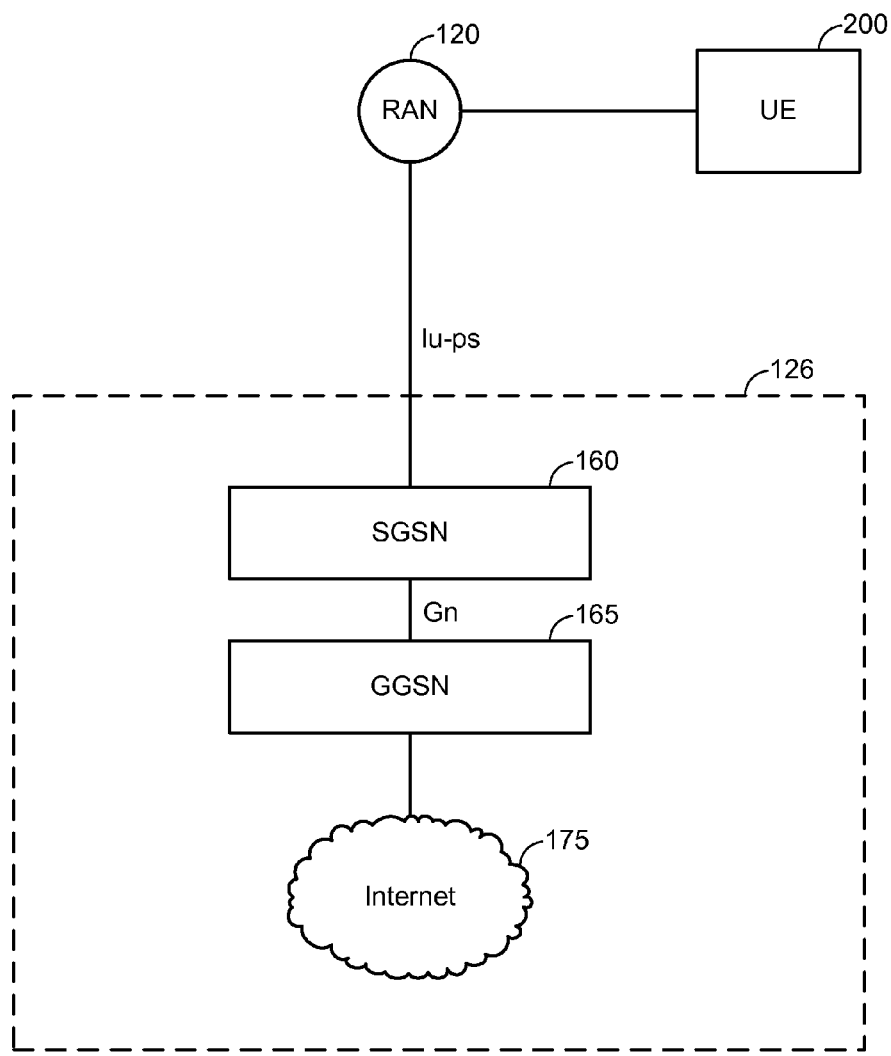
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.).

While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
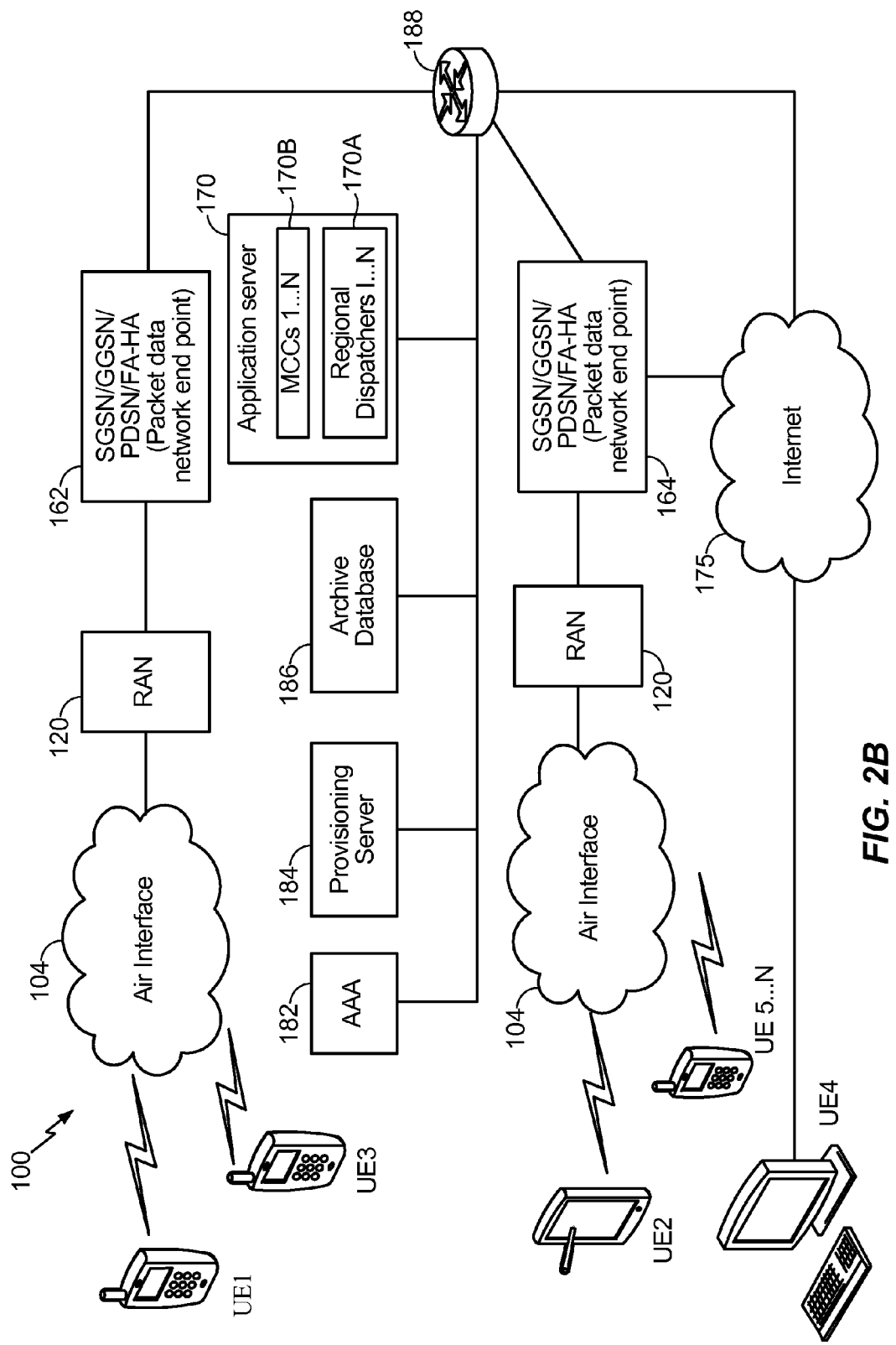
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an archive database 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, the archive database 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the archive database 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
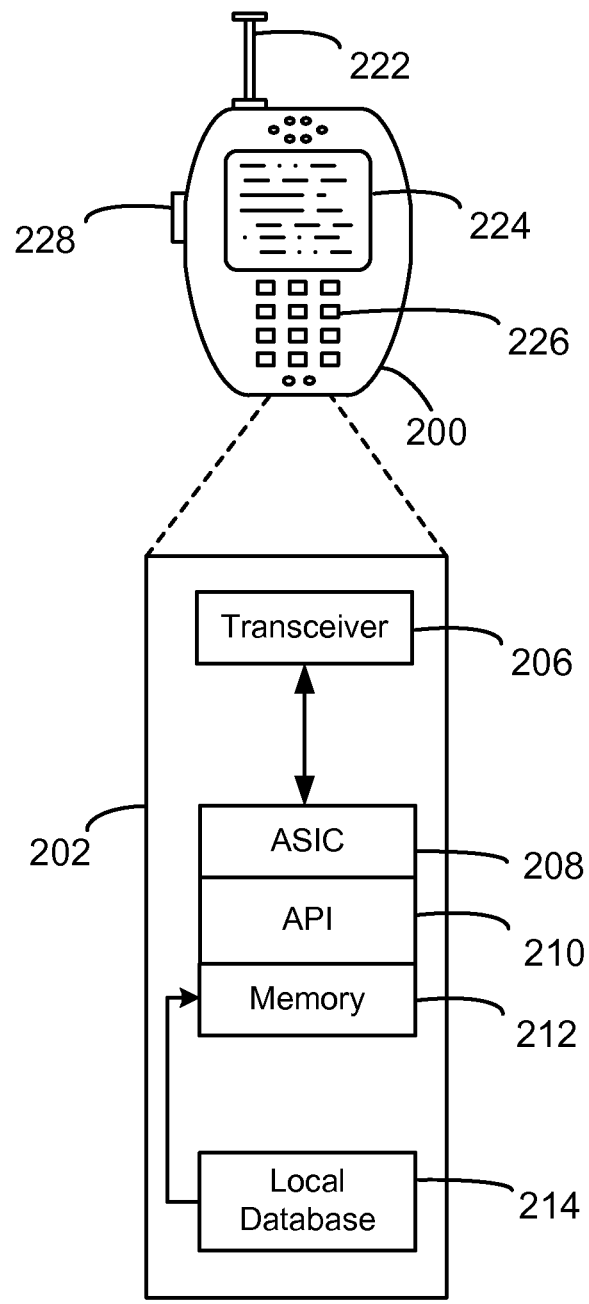
FIG. 3 is an illustration of user equipment in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

Conventionally, when a given user equipment (UE) determines to initiate a communication session with two or more other UEs, the given UE (or session originator) requests initiation of the communication session with a network-side application server, such as the application server 170 shown in FIG. 2B, which is responsible for arbitrating the group communication session as well as implementing control functions for the session. For example, the logic associated with creating the group communication session (e.g., figuring out which UEs belong to the group, etc.) resides on the application server 170, and in-call management functions (e.g., figuring out which UEs are actively participating in the session, etc.) also reside on the application server 170. Thus, in conventional group communication sessions, new clients or UEs that join the group communication session register with the application server 170, after which the application server 170 notifies the participating UEs of the new member. Likewise, in conventional group communication sessions, clients or UEs that leave the group communication session notify the application server 170 of their departure, after which the application server 170 notifies the participating UEs of the exiting member. As new UEs join and/or leave the group communication session, the application server 170 is responsible for maintaining 'group state' information, which means that the application server 170 maintains an awareness of which UEs are actively participating in the group communication session, as shown below with respect to FIG. 4.

Figure 4:
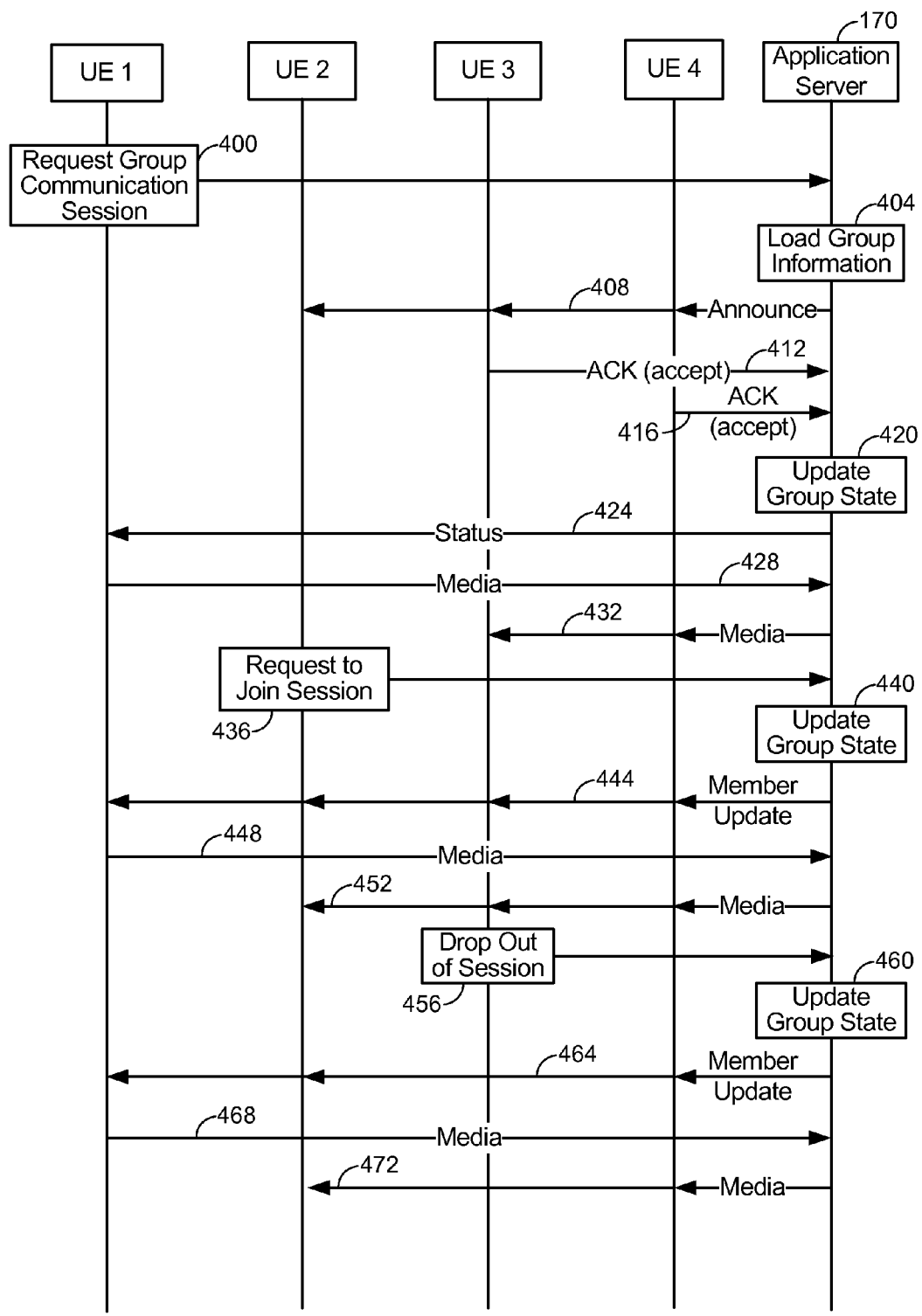
FIG. 4 illustrates a process of setting up a conventional group communication session.

FIG. 4 illustrates a process of setting up a conventional group communication session. Referring to FIG. 4, a given UE ("UE 1") determines to initiate a group communication session with a group that includes at least UEs 2 . . . 4, and thereby sends a group session initiation request (or call message) to the application server 170, 400. The group session initiation request of 400 is configured to include a predetermined group ID associated with the group, whereby the predetermined group ID is provisioned at the UE 1 by an external entity and is not independently generated at UE 1. While not shown explicitly in FIG. 4, it will be appreciated that the group session initiation request of 400 can be sent by UE 1 to the RAN 120, which then forwards or routes the group session initiation request to the application server 170.

The application server 170 receives the group session initiation request and then loads group information associated with the group identified by the predetermined group ID contained therein, 404. For example, the application server 170 can maintain a table that maps group IDs to corresponding group information such as a current list of group-members that belong to the group, the permissions and/or priorities of the various group members, and so on. After identifying and locating the group-members associated with the predetermined group ID, the application server 170 sends an announce message to each of the target UEs belonging to the group, 408. In FIG. 4, assume that UEs 3 . . . 4 receive the announce message and respond to the announce message with a positive acknowledgment (ACK) indicating a desire to join the group communication session, 408 and 412. Further assume that UE 2 receives the announce message and becomes aware of the group communication session, but does not join the group communication session. At this point, the application server 170 determines that the group communication session can begin, and instantiates a group state that contains information associated with the active group communication session, such as which UEs or group-members are actively participating in the group communication session, 420. For example, the group state at 420 of FIG. 4 includes information indicating that UEs 1, 3 and 4 are actively participating in the group communication session, which UE originated the session, the respective priorities and/or permissions of the UEs, and so on. Thereafter, based on the group state, the application server 170 will know where to route information to be sent to the group.

The application server 170 sends a status message to UE 1 (i.e., the session originator) in 424 indicating that UE 1 can begin speaking (or transmitting other media) to the group (along with an indication that UEs 3 and 4 have joined the session). UE 1 then begins transmitting media to the application server 170, 428. The application server 170 receives the media from UE 1 to be sent to the group in association with the predetermined group ID, and the application server 170 identifies UEs 3 and 4 as target UEs for UE 1's media based on the current group state and then forwards UE 1's media to UEs 3 and 4, 432.

At some later point in time, UE 2 transmits a request to join the group communication session to the application server 170, 436. The application server 170 updates the group state to reflect that UEs 1 . . . 4 are currently participating in the group communication session, 440, and the application server 170 notifies UEs 1, 3 and 4 that UE 2 has joined the group communication session, 444. UE 1 continues to transmit media to the application server 170, 448, and the application server 170 identifies UEs 2 . . . 4 as target UEs for UE 1's media based on the current group state and then forwards UE 1's media to UEs 2 . . . 4, 452.

At some later point in time, UE 3 sends a request to the application server 170 that indicates UE 3 is exiting or dropping out of the group communication session, 456. The application server 170 updates the group state to reflect that UE 3 is no longer participating in the group communication session, 460, and the application server 170 notifies UEs 1, 2 and 4 that UE 3 has left the group communication session, 464. UE 1 continues to transmit media to the application server 170, 468, and the application server 170 identifies UEs 2 and 4 as target UEs for UE 1's media based on the current group state and then forwards UE 1's media to UEs 2 and 4, 472.

As will be appreciated from a review of FIG. 4, as groups scale in size and/or a frequency at which UEs join and/or leave the group communication session increases, the burden of the application server 170 maintaining the group state can likewise increase. Also, the total number of group sessions in the system is proportional to the total number of users in the system. Therefore, in order to increase the capacity of the system, it becomes necessary to add not only support for a higher number of users on the application server 170, but also to add support for a higher number of group communication sessions on the server.

Embodiments of the invention are thereby directed to offloading management functions associated with the group communication session from the application server 170 to one or more of the UEs participating in the group communication session. In particular, the role of the application server 170 is reduced and the participating UEs are configured to provide the application server 170 with more explicit instructions with regard to how group session data is to be forwarded. The application server 170 is not responsible for maintaining the group state, for instance. Rather, the group state is maintained independently by the UEs participating in the group communication session.

Figure 5:
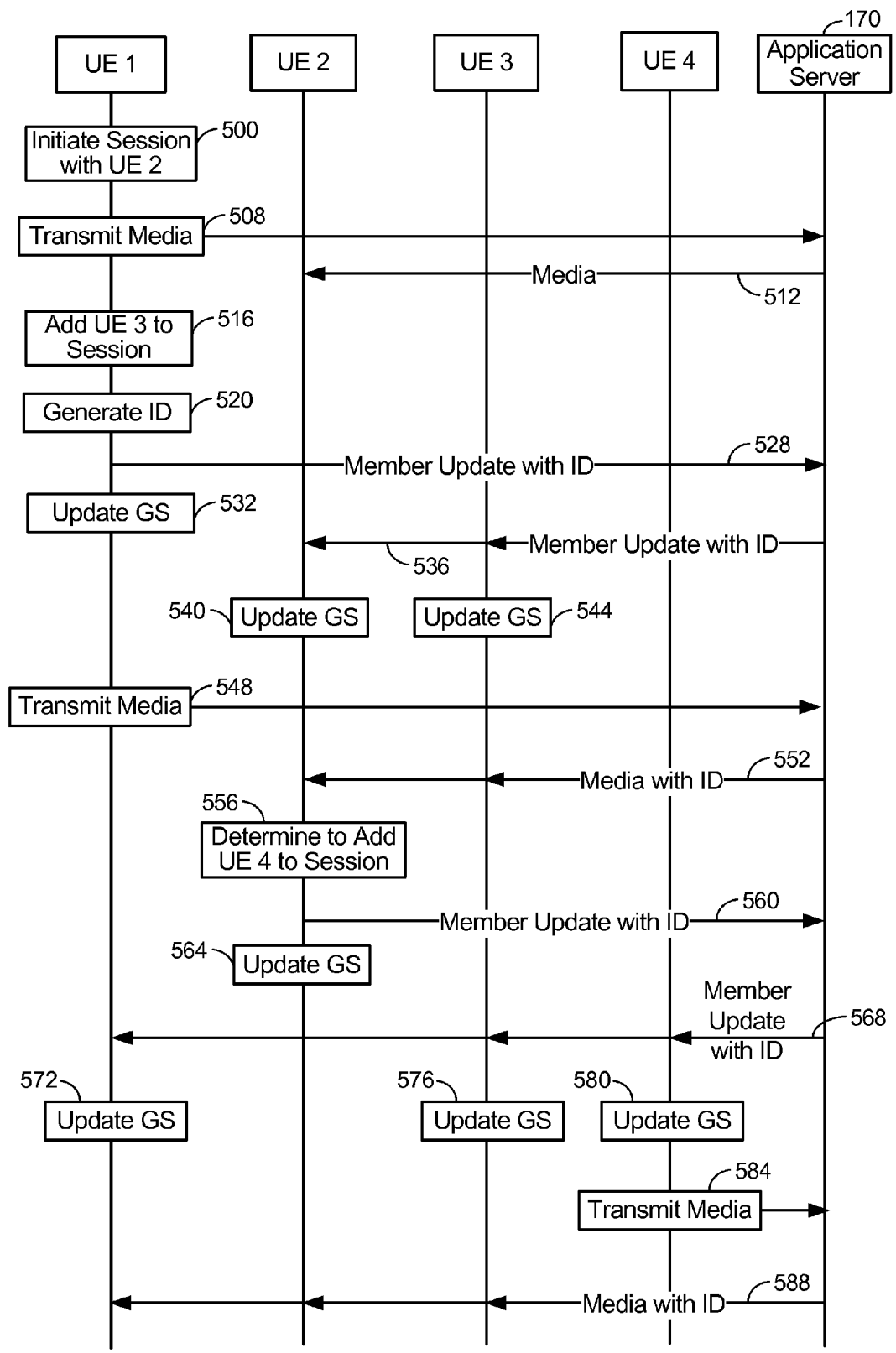
FIG. 5 illustrates a process of setting-up and adding participants to a group communication session in accordance with an embodiment of the present invention.

FIG. 5 illustrates a process of setting-up and adding participants to a group communication session in accordance with an embodiment of the present invention. Referring to FIG. 5, a given UE ("UE 1") determines to initiate a one-to-one communication session with UE 2, 500. UE 1 transmits media (e.g., a text message, etc.) associated with the one-to-one communication session to the application server 170, 508, and the application server 170 forwards the media to target UE 2, 512. At this point, UEs 1 and 2 are not engaged in a 'group' communication session (i.e., a session that can include three or more participating UEs).

Referring to FIG. 5, at some later point in time, UE 1 determines to add or join UE 3 to the communication session, thereby transitioning the one-to-one communication between UEs 1 and 2 into a true 'group' communication session, 516. Instead of loading a pre-provisioned or predetermined group identifier (ID) associated with a communication group that includes UEs 1 . . . 3, UE 1 generates a unique group session ID ("session ID") associated with the group communication session being set-up by UE 1, 520. For example, the session ID can be generated in 520 by combining or hashing a UE-specific identifier associated with UE 1 and/or a user-specific identifier with a timestamp (e.g., for example, a timestamp of when UE 1 determined to add UE 3 in 516). Thereafter, the session ID generated in 520 is included or tagged to any messages (e.g., group management messages and/or media messages) exchanged between group-members during the group communication session.

UE 1 initiates the group communication session with UEs 2 and 3 by configuring and transmitting a 'create group' (or an initial member update message) to the application server 170, 528. The member update message includes the session ID along with a complete listing of each group-member of the group communication session (e.g., in this case, UEs 1 . . . 3). The member update message can also include 'metadata' associated with the group communication session, such as usernames (or nicknames) associated with the group-members, user 'avatars' or images to be associated with one or more of the group-members, and so on. In an example, each message exchanged in association with the group communication session, such as the member update message of 528, includes the session ID generated in 520.

In 532, after transmitting the member update message in 528, UE 1 generates a group state associated with the group communication session. The group state can include the current member-list of the group communication session, any associated metadata and/or group management information (e.g., user nicknames, avatars, etc.), and so on. In at least one embodiment, the group state and its associated metadata can be stored in a persistent storage on UE 1. For example, the group state can be stored within a contact entry in a client address book of UE 1, along with any associated metadata. In this case, if a multimedia client on UE 1 stops running (e.g., due to a 'crashing' of UE 1 or if UE 1 is rebooted), the group state and its associated metadata can be restored or reloaded from the persistent storage the next time the multimedia client is re-started on UE 1. The group state can also include session-control or session-restriction information, which will be discussed in more detail below with respect to FIGS. 8A and 8B.

In the embodiment of FIG. 5, upon receiving the member update message for initiating the group communication session, the application server 170 is not required to look-up group membership information based on the session ID as in 404 of FIG. 4 and/or update a group state associated with the communication session as in 420 of FIG. 4. Rather, the application server 170 simply receives the member update message, locates the target UE(s) (e.g., in this case, UEs 2 and 3) indicated by the member update message and then forwards the member update message to the target UE(s) (i.e., UEs 2 and 3) in 536. As an example, the target UEs of any member update message correspond to the complete list of group-members contained in the member update message minus the UE that provided the member update message. Referring to FIG. 5, the target UEs 2 and 3 each receive the member update message from the application server 170 and generate group states for the group communication session, 540 and 544 (e.g., similar to UE 1 at 532).

Referring to FIG. 5, UE 1 transmits media to the group in 548, whereby the media transmission includes the session ID and also includes a listing of target UEs (e.g., UEs 2 and 3). The application server 170 receives the media transmission from UE 1, and forwards UE 1's media to the target UEs 2 and 3, 552. At some later point in time, UE 2 determines to add or join UE 4 to the communication session, 556. In the embodiment of FIG. 5, it is assumed that UE 2 has the authority to add new members to the session because the group communication session is 'unrestricted', which in this case means any participating UE can add other UEs to the group communication session. However, not all group communication sessions are unrestricted as will be discussed below with respect to FIGS. 8A and 8B.

Referring to FIG. 5, UE 2 configures and transmits a member update message to the application server 170, 560. In 560, the member update message includes the session ID along with a listing of UEs 1 ... 4 as group-members. UE 2 also updates its group state to reflect that UE 4 is now a part of the communication group, 564. The application server 170 receives the member update message in 560, and then transmits the member update message to target UEs 1, 3 and 4 in 568. The target UEs 1, 3 and 4 each receive the member update message from the application server 170 and update (or, in the case of UE 4, generate) the group state for the communication session, 572, 576 and 580.

After UE 4 is added to the group communication session, UE 4 transmits media to the group in 584, whereby UE 4's media transmission includes the session ID and also includes a listing of target UEs (e.g., UEs 1 ... 3). The application server 170 receives the media transmission from UE 4, and forwards UE 4's media to the target UEs 1 ... 3, 588.

Figure 6:
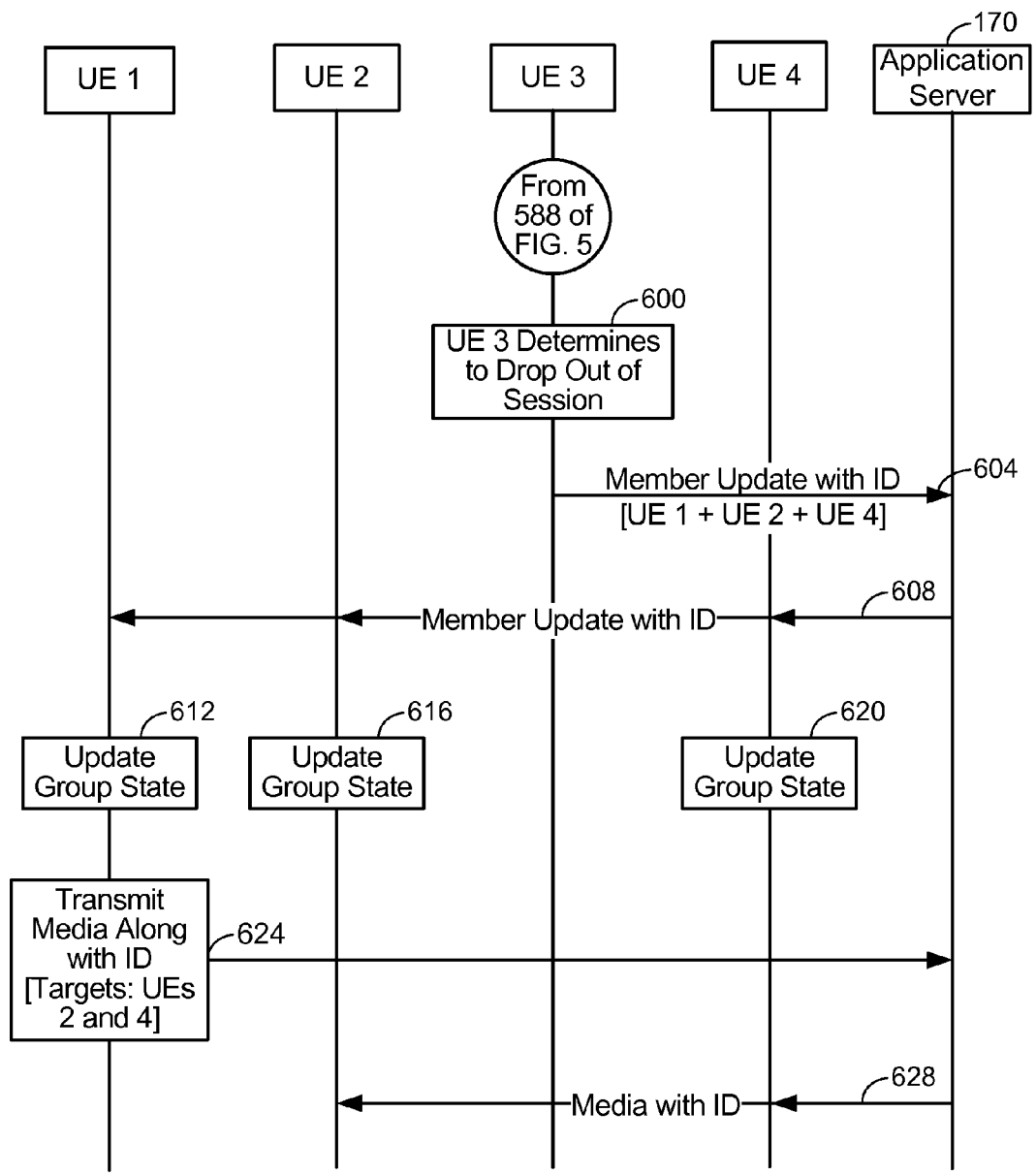
FIG. 6 illustrates a continuation of the process of FIG. 5 in accordance with an embodiment of the invention.

FIG. 6 illustrates a continuation of the process of FIG. 5 in accordance with an embodiment of the invention. Referring to FIG. 6, at some point after 588 of FIG. 5 while UEs 1 ... 4 are each active participants in the group communication session, assume that UE 3 determines to exit or drop out of the group communication session, 600. UE 3 configures and transmits a member update message to the application server 170, 604. In 604, the member update message includes the session ID along with a listing of UEs 1, 2 and 4 as group-members. In other words UE 3 omits itself from the group-listing in the member update message in order to notify the other UEs that UE 3 has dropped out of the session. While not shown explicitly in FIG. 6, UE 3 can optionally remove or delete its group state for the group communication session after dropping out of the session.

Referring to FIG. 6, the application server 170 receives the member update message in 604 and then transmits the member update message to target UEs 1, 2 and 4 in 608. The target UEs 1, 2 and 4 each receive the member update message from the application server 170 and update their group states for the communication session, 612, 616 and 620. Thus, the group states maintained at UE 1, 2 and 4 are updated to reflect that UE 3 has dropped out of the group communication session. After UE 3 is dropped to the group communication session, UE 1 transmits media to the group in 624, whereby UE 1's media transmission includes the session ID and also includes a listing of target UEs (e.g., UEs 2 and 4). The application server 170 receives the media transmission from UE 1, and forwards UE 1's media to the target UEs 2 and 4, 628.

Figure 7:
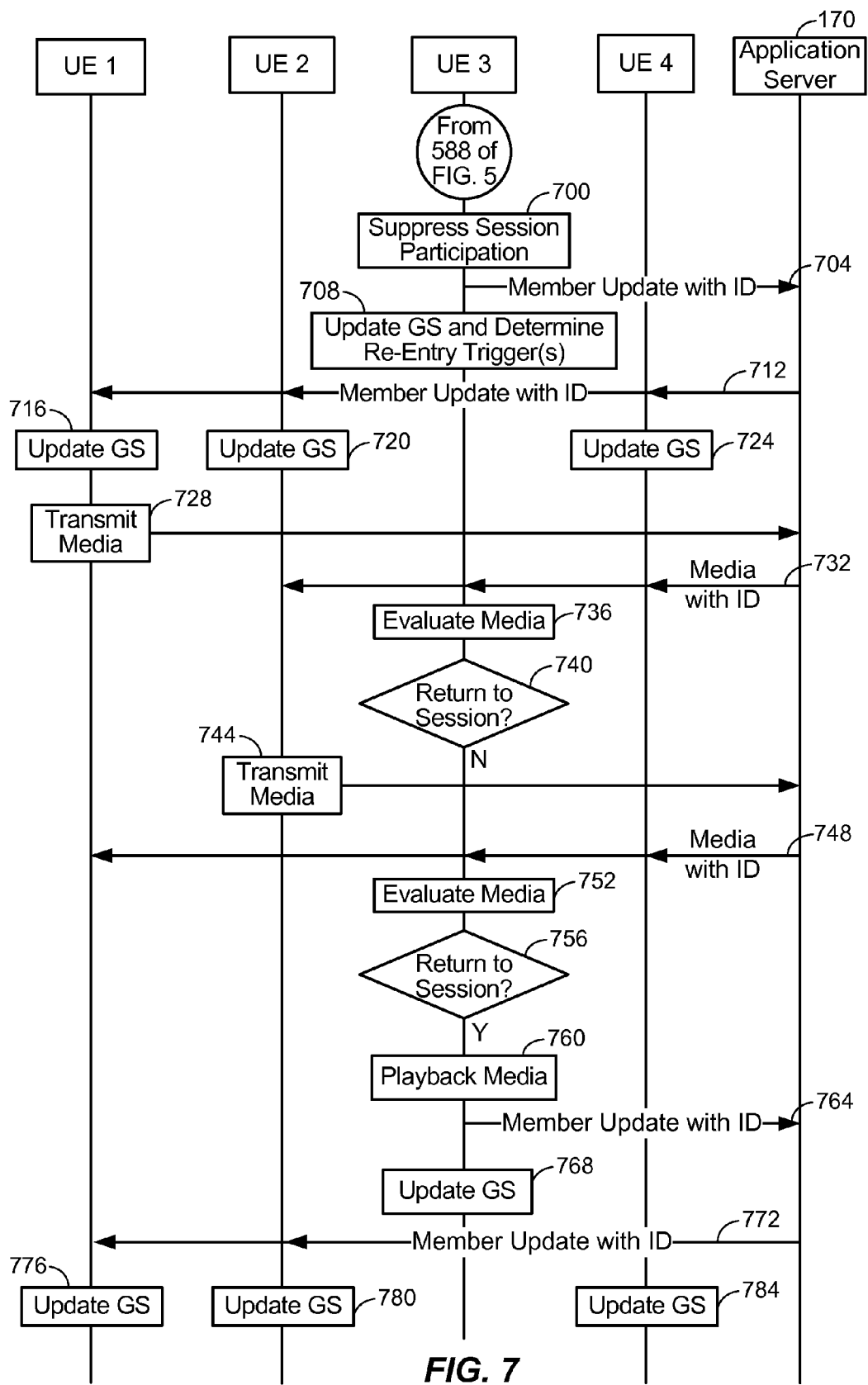
FIG. 7 illustrates a continuation of the process of FIG. 5 in accordance with another embodiment of the invention.

FIG. 7 illustrates a continuation of the process of FIG. 5 in accordance with another embodiment of the invention. Whereas FIG. 6 is directed an example whereby UE 3 drops out of the group communication session entirely, FIG. 7 is directed to an example whereby UE 3 reduces or suppresses its participation level in the group communication session while maintaining at least a threshold level of participating in the group communication session.

Referring to FIG. 7, at some point after 588 of FIG. 5 while UEs 1 ... 4 are each active participants in the group communication session, assume that UE 3 determines to suppress its participation of the group communication session, 700. For example, a user of UE 3 can determine that he/she is not interested in a current topic of conversation of the group communication session, but that the user wants to maintain a presence in the session in case the conversation returns to a topic of interest to the user. In this case, the user of UE 3 may want to suppress his/her participation level in the group communication session until the topic of interest is detected. Alternatively, UE 3 may automatically determine that the user is unlikely to be interested in the current topic of conversation of the group communication session based on a user profile, and may suppress his/her participation level in the group communication session until a topic of interest is detected. In another example, the user of UE 3 may only be interested in receiving media from a subset of the UEs participating in the group communication session. When the subset is not transmitting media to the group, the user of UE 3 may become less interested in the group communication session, causing the user of UE 3 to suppress his/her participation level in the group communication session. For example, UE 3 may be configured to receive media from each UE participating in the group communication session but only output (e.g., via speakers, a display device, etc.), to the user of UE 3, the media that is received from the subset of UEs that include UEs of more relevance or importance to the user of UE 3. On the other hand, UE 3 can be configured to ignore or drop media from UEs that are not part of the subset such that this media is not presented to the user of UE 3.

Referring to FIG. 7, UE 3 configures and transmits a member update message to the application server 170. In 704, the member update message includes the session ID along with a listing of UEs 1, 2 and 4 as 'active' or full-participation group-members, and the member update message also indicates UE 3 as a partially-active or partial-participation group-member. The member update message thereby functions to put UEs 1, 2 and 4 on-notice that UE 3 still wants to receive media from the other UEs in association with the group communication session, but that UE 3 may not be fully responsive to the media. For example, if the suppressed participation level of UE 3 is associated with the user of UE 3 being presented with media from only a subset of the participating UEs, the member update message may function to deter or discourage UEs that are not part of the subset from transmitting media to UE 3.

UE 3 also updates its group state for the group communication session to reflect that UE 3 has transitioned from full-participation mode to a reduced or suppressed-participation mode, 708. Also in 708, UE 3 determines one or more re-entry triggers by which the UE 3 will resume full-participation in the group communication session. The re-entry triggers can include, for example, an explicit command from the user of UE 3 to resume full-participation in the group communication session and/or one or more event-based triggers. The one or more event-based triggers can be based upon an evaluation of incoming media at UE 3, such as an identification of a current UE sending media to the group, a trigger word or phrase being present in the incoming media (e.g., a word or words within a text message, a word or words within audio content of incoming audio media, etc.). In an example, the re-entry triggers can be stored in association with the group state at UE 3.

Referring to FIG. 7, the application server 170 receives the member update message in 704, and then transmits the member update message to target UEs 1, 2 and 4 in 712. The target UEs 1, 2 and 4 each receive the member update message from the application server 170 and update the group state for the communication session, 716, 720 and 724. Thus, the group states maintained at UE 1, 2 and 4 are updated to reflect that UE 3 has transitioned to a suppressed participation mode in the group communication session. At some later point in time, UE 1 transmits media to the group in 728, whereby UE 1's media transmission includes the session ID and also includes a listing of target UEs (e.g., UEs 2 . . . 4). The application server 170 receives the media transmission from UE 1, and forwards UE 1's media to the target UEs 2 . . . 4, 732.

While not shown explicitly in FIG. 7, as fully participating UEs in the group communication session, UEs 2 and 4 receive and playback UE 1's media in 732. Instead of arbitrarily presenting the media at UE 3, UE 3 evaluates UE 1's media to determine whether one or more of the re-entry triggers are satisfied in 736. In other words, the evaluation of 736 occurs at a lower-level of an application stack at UE 3 as compared to a level of the application stack that is responsible for playback of the media. Thus, the evaluation functions to filter-out potentially unwanted media from playback to the user of UE 3. Based on the evaluation from 736, UE 3 determines whether to transition back to full-participation mode for the group communication session in 740 (i.e., whether to begin outputting received media again to the user of UE 3). In the embodiment of FIG. 7, assume that the UE 3 is particularly interested in media from UE 2 such that the re-entry triggers include receipt of media from UE 2. Because UE 1 (i.e., not UE 2) sent the media evaluated by UE 3 in 736, UE 3 determines not to transition back to full-participation mode in 740.

Next, UE 2 transmits media to the group in 744, whereby UE 2's media transmission includes the session ID and also includes a listing of target UEs (e.g., UEs 1, 3 and 4). The application server 170 receives the media transmission from UE 2, and forwards UE 2's media to the target UEs 1, 3 and 4, 748.

While not shown explicitly in FIG. 7, as fully participating UEs in the group communication session, UEs 1 and 4 receive and playback UE 2's media in 748. Instead of arbitrarily presenting the media at UE 3, UE 3 evaluates UE 2's media to determine whether one or more of the re-entry triggers are satisfied in 752. Based on the evaluation from 752, UE 3 determines whether to transition back to full-participation mode for the group communication session in 756. In the embodiment of FIG. 7, assume that the UE 3 is particularly interested in media from UE 2 such that the re-entry triggers include receipt of media from UE 2. Because UE 2 sent the media evaluated by UE 3 in 752, UE 3 determines to transition back to full-participation mode in 756.

After determining to resume full-participation in the group communication session, UE 3 plays (or presents) the media received from UE 2 that was evaluated in 752, 760, and UE 3 also configures and transmits a member update message to the application server 170, 764. In 764, the member update message includes the session ID along with a listing of UEs 1 . . . 4 as 'active' or full-participation group-members. The member update message thereby functions to put UEs 1, 2 and 4 on-notice that UE 3 is resuming full-participation in the group communication session. UE 3 also updates its group state for the group communication session to reflect that UE 3 has transitioned back to full-participation mode from the reduced or suppressed-participation mode, 768.

Referring to FIG. 7, the application server 170 receives the member update message in 764, and then transmits the member update message to target UEs 1, 2 and 4 in 772. The target UEs 1, 2 and 4 each receive the member update message from the application server 170 and update the group state for the communication session, 776, 780 and 784. Thus, the group states maintained at UE 1, 2 and 4 are updated to reflect that UE 3 has transitioned back to full-participation mode in the group communication session.

Figure 8A:
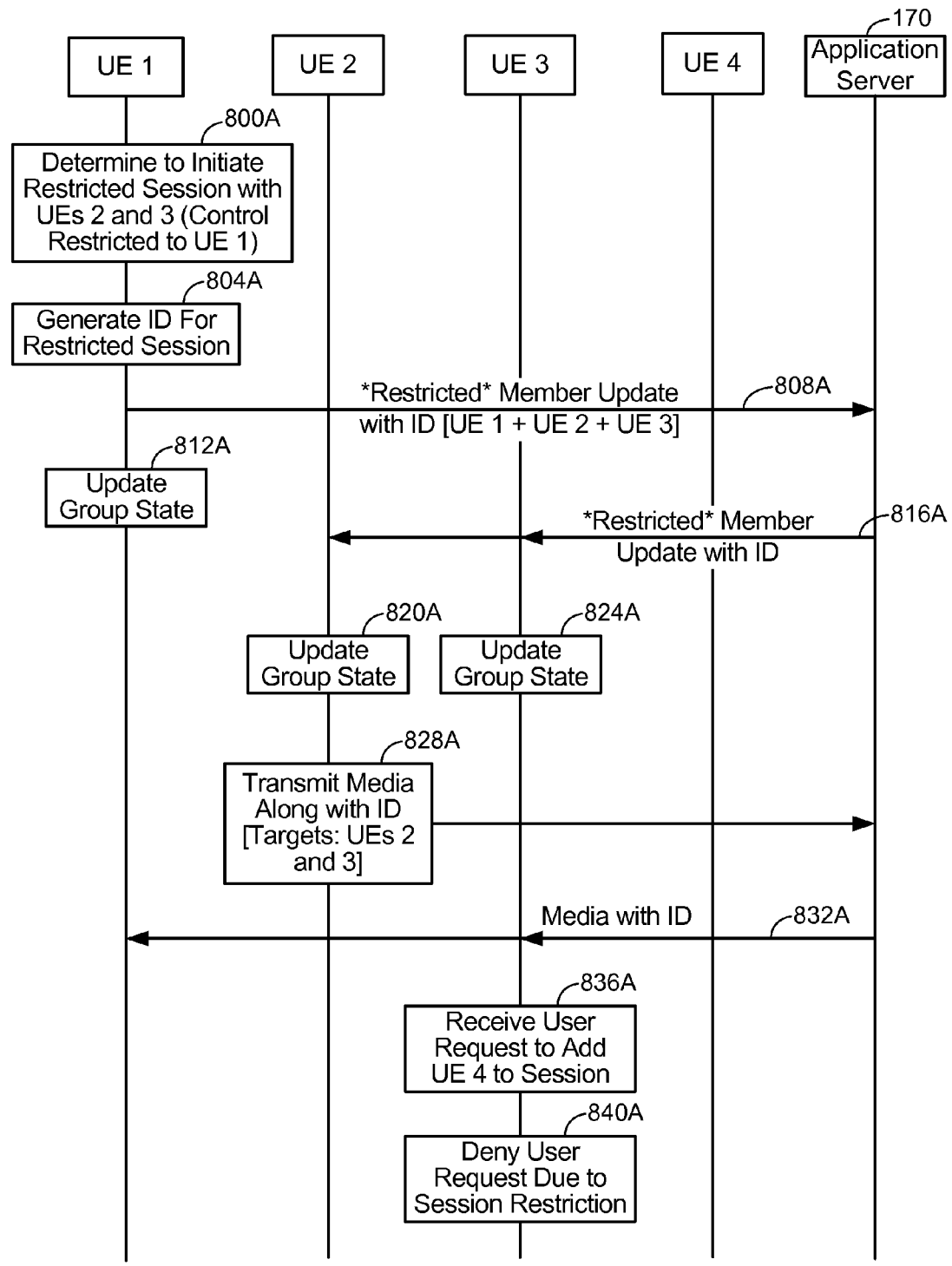
FIG. 8A illustrates a process of setting-up a restricted or controlled group communication session in accordance with an embodiment of the present invention.
Figure 8B:
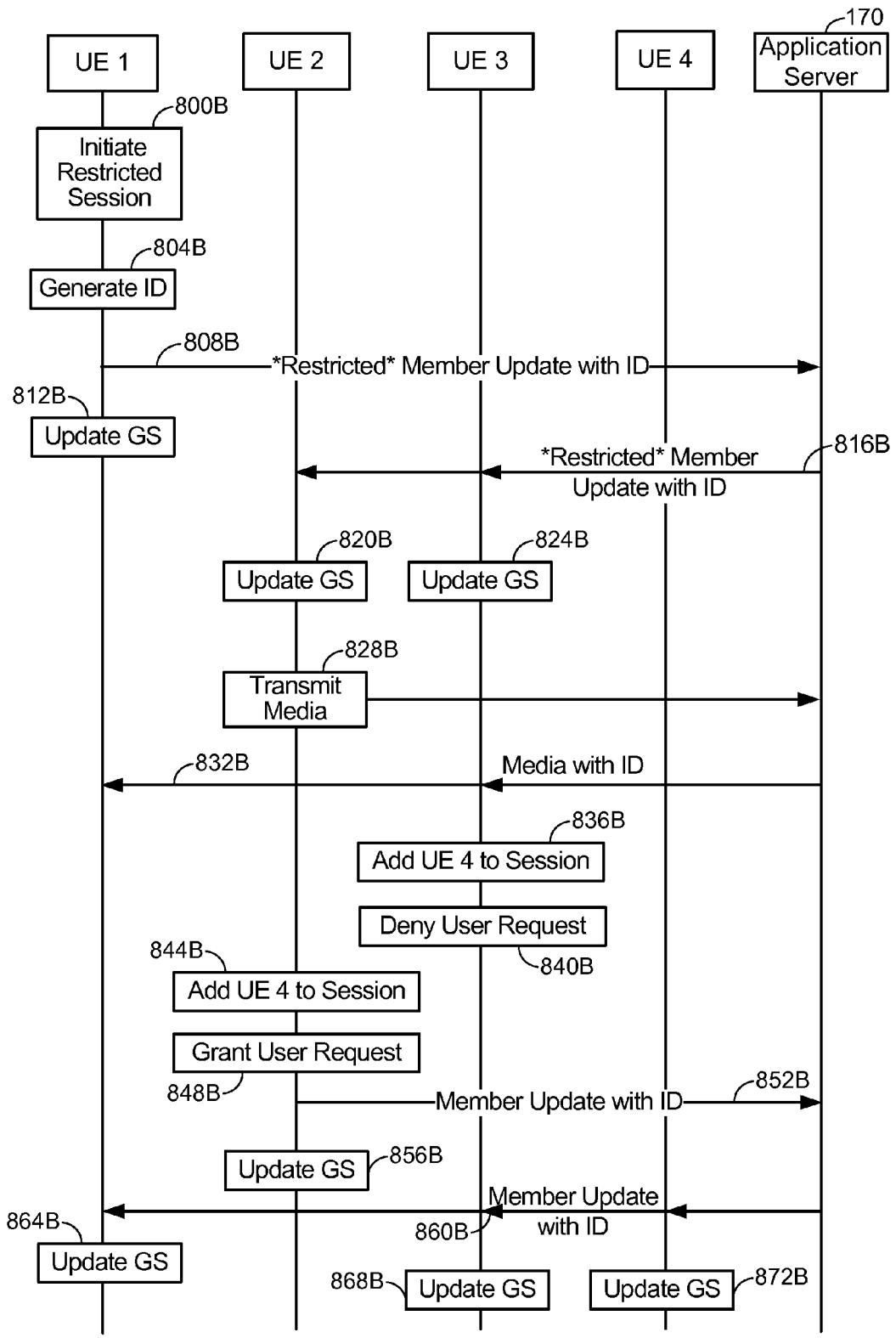
FIG. 8B each illustrate a process of setting-up a restricted or controlled group communication session in accordance with another embodiment of the present invention.

FIGS. 8A and 8B each illustrate a process of setting-up a restricted or controlled group communication session in accordance with an embodiment of the present invention. In particular, FIG. 8A is directed to a group communication session whereby control is restricted to a single UE (e.g., the session originator or UE 1), and FIG. 8B is directed to a group communication session whereby control is restricted to a given set of UEs (e.g., the session originator or UE 1 and also UE 2).

Referring to FIG. 8A, a given UE ("UE 1") determines to initiate a group communication session with UEs 2 and 3 with control over one or more parameters associated with the group communication session restricted to UE 1, 800A. As used herein, 'control' over the group communication session relates to group management (or arbitration) decisions that affect parameters of the session. For example, the parameters that can be controlled by UE 1 can include which UEs are permitted to join (or be added to) the group communication session and/or include which UEs are permitted to join (or add) other UEs the group communication session, which UEs are permitted to partake in a suppressed or reduced participation mode in the group communication session, the name of the group, the avatars (e.g., pictures or icons) used by the various group members, and so on. Further, any number of the above-noted parameters can be associated with the restriction, such that certain parameters can be modified by any UE in the group communication session (e.g., any participating UE can change their avatar or picture), while other parameters would be restricted. Also, the initial 'controller' or arbitrator of the session (e.g., UE 1 in the case of FIG. 8A) can modify which parameters are restricted (and/or a degree to which the parameters are restricted) during the group communication session.

Similar to 520 of FIG. 5, UE 1 generates a unique group session ID ("session ID") associated with the restricted group communication session being set-up by UE 1, 804A. UE 1 initiates the group communication session with UEs 2 and 3 by configuring and transmitting a 'create group' message (e.g., or an initial member update message) to the application server 170, 808A. Similar to 524 of FIG. 5, the member update message includes the session ID along with a complete listing of each group-member of the group communication session (e.g., in this case, UEs 1 . . . 3), and/or 'metadata' associated with the group communication session. Further, the member update message of 808A includes a flag or indication that control over the group communication session is restricted to UE 1 (e.g., UEs 2 and 3 can send media to the group but are prohibited from adding new group-members, etc.).

In 812A, after transmitting the member update message in 808A, UE 1 generates a group state associated with the group communication session. The group state generated in 812A is similar to the group state generated in 532 of FIG. 5, except the group state of 812A is further configured to indicate that control over the group communication session is restricted to UE 1 (e.g., a list of restricted parameters that UEs 2 and 3 are not permitted to modify and/or a list of unrestricted parameters that UEs 2 and 3 are permitted to modify). The application server 170 receives the member update message from UE 1, locates the target UEs 2 and 3, and then forwards the member update message to the target UEs 2 and 3, 816A. The target UEs 2 and 3 each receive the member update message from the application server 170 and generate group states for the group communication session, 820A and 824A. The group states generated at UEs 2 and 3 in 820A and 824A, respectively, are similar to the group states generated in 540 and 544 of FIG. 5, except that the group states of 820A and 824A are each further configured to indicate that control over the group communication session is restricted to UE 1 (e.g., a list of restricted parameters that UEs 2 and 3 are not permitted to modify and/or a list of unrestricted parameters that UEs 2 and 3 are permitted to modify).

Referring to FIG. 8A, UE 2 transmits media to the group in 828A, whereby the media transmission includes the session ID and also includes a listing of target UEs (e.g., UEs 1 and 3). The application server 170 receives the media transmission from UE 2, and forwards UE 2's media to the target UEs 1 and 3, 832A. At some later point in time, UE 3 determines to add or join UE 4 to the communication session, 836A. However, in the embodiment of FIG. 8A, it is assumed that control over the group communication session is restricted to UE 1 (i.e., in particular, the add-member function or parameter is restricted to UE 1), which means that UE 3 does not have the requisite authority to add UE 4 to the group communication session. Thus, UE 3 denies its user's request to add UE 4 to the group communication session in 840A. While not shown explicitly in FIG. 8A, UE 3 can optionally send a message to UE 1 the user of UE 3's behalf in order to request that UE 1 add UE 4 to the group communication session. UE 1 can then, in its discretion, selectively add UE 4 to the group communication session.

Turning to FIG. 8B, a given UE ("UE 1") determines to initiate a group communication session with UEs 2 and 3 with control over one or more parameters associated the group communication session restricted to UE 1 and UE 2, 800B. In other words, UEs 1 and 2 share control over the group communication session, whereas other UEs are not granted authority for certain group management (or arbitration) functions, such as modifying certain group parameters (e.g., adding new members to the session, etc.). Similar to 520 of FIG. 5, UE 1 generates a unique group session ID ("session ID") associated with the restricted group communication session being set-up by UE 1, 804B. In an example, similar to the generation of the session ID for the unrestricted group communication session at 520 of FIG. 5, the session ID can be generated in 804B by combining or hashing a UE-specific identifier associated with UE 1 and/or a user-specific identifier with a timestamp (e.g., for example, a timestamp of when UE 1 determined to initiate the restricted group communication session in 800B). Thereafter, the session ID generated in 804B is included or tagged to any messages (e.g., group management messages and/or media messages) exchanged between group-members during the group communication session.

UE 1 initiates the group communication session with UEs 2 and 3 by configuring and transmitting a 'create group' message (e.g., or an initial member update message) to the application server 170, 808B. Similar to 524 of FIG. 5, the member update message includes the session ID along with a complete listing of each group-member of the group communication session (e.g., in this case, UEs 1 . . . 3), and/or 'metadata' associated with the group communication session. Further, the member update message of 808B includes a flag or indication that control over the group communication session is restricted to UEs 1 and 2 (e.g., UE 3 can send media to the group but is prohibited from adding new group-members, etc.).

In 812B, after transmitting the member update message in 808B, UE 1 generates a group state associated with the group communication session. The group state generated in 812B is similar to the group state generated in 532 of FIG. 5, except the group state of 812B is further configured to indicate that control over certain parameters of the group communication session is restricted to UEs 1 and 2. The application server 170 receives the member update message from UE 1, locates the target UEs 2 and 3, and then forwards the member update message to the target UEs 2 and 3, 816B. The target UEs 2 and 3 each receive the member update message from the application server 170 and generate group states for the group communication session, 820B and 824B. The group states generated at UEs 2 and 3 in 820B and 824B, respectively, are similar to the group states generated in 540 and 544 of FIG. 5, except that the group states of 820B and 824B are each further configured to indicate that control over one or more session parameters of the group communication session is restricted to UEs 1 and 2 (e.g., a list of restricted parameters that UE 3 is not permitted to modify and/or a list of unrestricted parameters that UE 3 is permitted to modify).

Referring to FIG. 8B, UE 2 transmits media to the group in 828B, whereby the media transmission includes the session ID and also includes a listing of target UEs (e.g., UEs 1 and 3). The application server 170 receives the media transmission from UE 2, and forwards UE 2's media to the target UEs 1 and 3, 832B. At some later point in time, UE 3 determines to add or join UE 4 to the communication session, 836B. However, in the embodiment of FIG. 8B, control over the group communication session is restricted to UEs 1 and 2 (i.e., in particular, the add-member function or parameter is restricted to UEs 1 and 2), which means that UE 3 does not have the requisite authority to add UE 4 to the group communication session. Thus, UE 3 denies its user's request to add UE 4 to the group communication session in 840B.

Next, UE 2 determines to add or join UE 4 to the communication session, 844B. While not shown explicitly in FIG. 8B, UE 2's user request to add UE 4 to the group communication can be the result of a request sent to UE 2 from UE 3 to add UE 4 to the group communication session. In the embodiment of FIG. 8B, control over the group communication session is restricted to UEs 1 and 2, which means that UE 2 has the requisite authority to add UE 4 to the group communication session. Accordingly, UE 2 grants its user's request to add UE 4 to the group communication session in 848B.

UE 2 configures and transmits a member update message to the application server 170, 852B. In 852B, the member update message includes the session ID along with a listing of UEs 1 . . . 4 as group-members. UE 2 also updates the group state to reflect that UE 4 is now a part of the communication group, 856B. The application server 170 receives the member update message in 852B and then transmits the member update message to target UEs 1, 3 and 4 in 860B. The target UEs 1, 3 and 4 each receive the member update message from the application server 170 and update (or, in the case of UE 4, generate) the group state for the communication session, 864B, 868B and 872B.

While not shown explicitly in FIGS. 8A and/or 8B, a UE controlling the group communication session (e.g., UE 1 in FIG. 8A or UEs 1 and/or 2 in FIG. 8B) can 'promote' other UEs to a higher permissions status. In other words, additional group arbitrators can be created by existing group arbitrators. For example, with respect to FIG. 8A, if UE 1 detects its connection to the RAN 120 is weakening, UE 1 can promote another UE as another group arbitrator so that the session can be maintained in the event UE 1 leaves the session.

Figure 9:
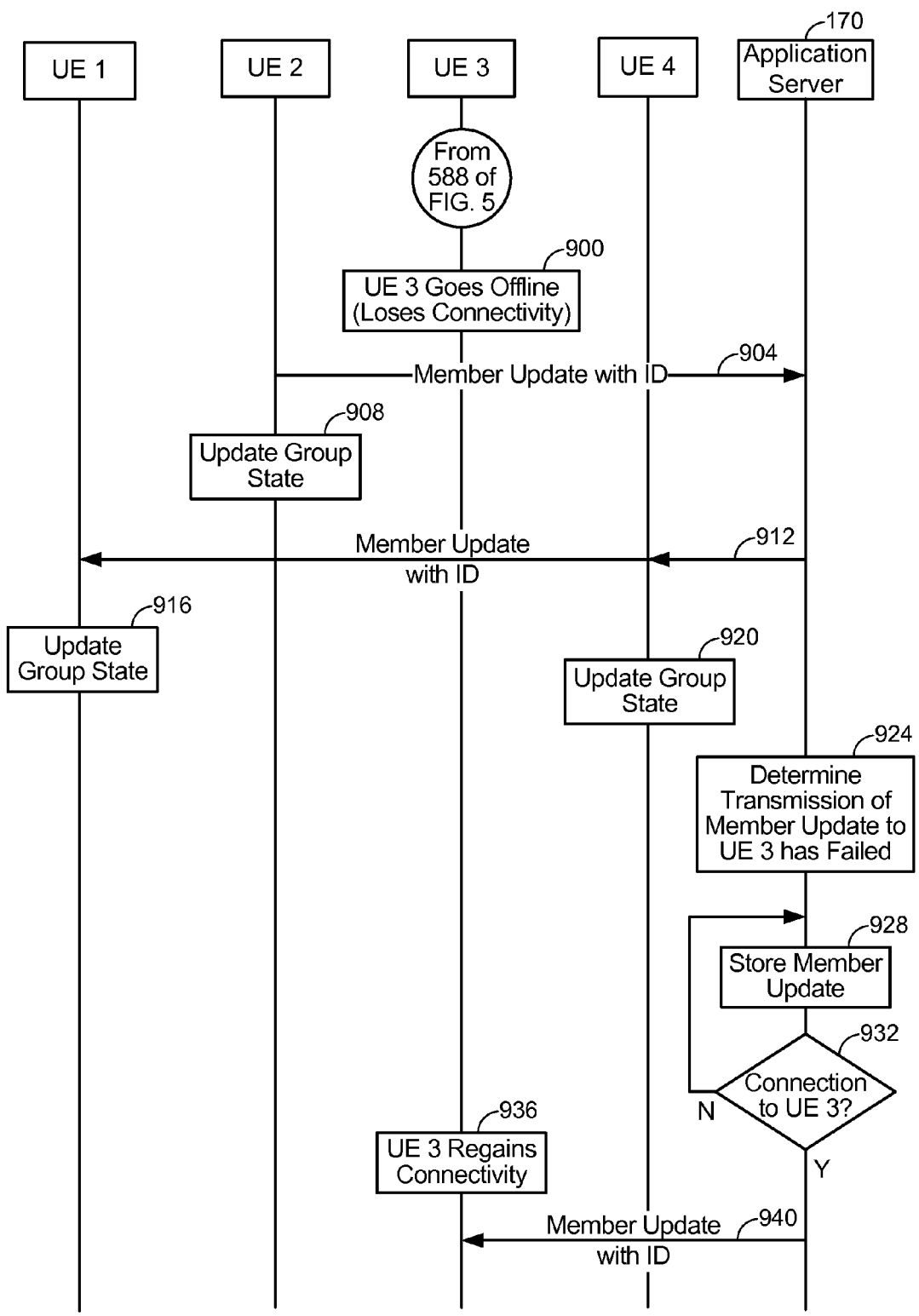
FIG. 9 illustrates a server-recovery operation that occurs when a given UE loses its connection during a group communication session in accordance with an embodiment of the invention.

FIG. 9 illustrates a server-recovery operation that occurs when a given UE ("UE 3") loses its connection during a group communication session in accordance with an embodiment of the invention. Referring to FIG. 9, after 588 of FIG. 5, assume that UE 3 goes offline or loses its connectivity, such that UE 3 can no longer receive messages from the application server 170, 900. Next, assume that UE 2 sends a member update message, 904, to the application server 170 for transmission to the communication group, i.e., UEs 1, 3 and 4. UE 2 updates its group state based on whatever trigger caused UE 2 to send the member update message, 908. The application server 170 successfully transmits UE 2's member update message to UEs 1 and 3, but is unable to send the member update message to UE 3 because UE 3 is offline, 912. UEs 1 and 3 update their group states for the group communication session based on the member update message, 916 and 920.

In 924, the application server 170 determines that its attempt to transmit the member update message to UE 3 has failed, and the application server 170 stores the member update message in order to send the stored member update message to UE 3 when UE 3 regains its connection, 928. For example, the member update message can be stored on a persistent storage on the application server 170 in a 'stateless' manner in 928. In other words, the application server 170 need not store the group state (except by virtue of storing the member update message itself). After storing the member update message, the application server 170 determines whether UE 3 is back online, 932. For example, the application server 170 can determine that UE 3 is back online responsive to a query, from UE 3, that requests data 'missed' by UE 3 during UE 3's period of disconnection. In another example, the application server 170 can periodically attempt to re-establish a connection with UE 3, and can determine UE 3 to be back online when the connection is successfully reestablished.

While UE 3 remains disconnected from the application server 170, the application server 170 can update or log any subsequent member update messages (e.g., which are indicative of member-add, member-remove and/or member-suppress events) during subsequent iterations of 928. For example, newer member update messages (e.g., indicating member-add, member-remove and/or member-suppress events) can either be stored in addition to previous member update messages, or alternatively newer member update messages can replace previously received member update messages in storage (e.g., due to older member updates messages being less relevant and/or storage limitations of the application server 170).

At some later point in time, UE 3 regains connectivity, 936. When the application server 170 detects that UE 3 is back online in 932, the application server 170 retrieves the stored member update message(s) (e.g., all member update messages received at the application server 170 during UE 3's period of disconnection, or simply the most recently received member update message) and forwards the member update message to UE 3, 940.

While the embodiments of the invention are described above with respect to FIGS. 4 through 9 under the assumption that each UE that participates in the group communication session is under the control of a local operator or user, in other embodiments of the invention one or more of the UEs or clients in the group communication session can correspond to an automated 'proxy'. In other words, any UE described above as participating in the group communication session can be pre-programmed (e.g., by some other client or UE) to initiate group communication sessions on behalf of another UE and/or to operate in a pre-defined manner during an already initiated group communication session. For example, a proxy UE can join the group communication session on behalf of another UE and then record traffic associated with the group communication session. The proxy UE is thereby performing a type of archiving function for the 'master' UE. In another example, the proxy UE can initiate the group communication session at a particular time on behalf of the master UE. For example, if the master UE expects to lack a connection at the start of the group communication session, the master UE can rely upon the proxy UE to set-up the group communication session and the master UE can later join the session when its connection can be established.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, it will be appreciated that the above-described embodiments can be implemented with respect to half-duplex group communication sessions (e.g., PTT, PTX, etc.) and/or full-duplex group communication sessions (e.g., VoIP, etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing group state information associated with a communication session that is mediated by a server, comprising:
    maintaining, at a given user equipment (UE) participating in the communication session, an identifier associated with the communication session and a list of UEs that are currently participating in the communication session;
    determining, at the given UE, to suppress a participation level of the given UE in the communication session;
    configuring a member update message to include the communication session identifier and to indicate the suppressed participation level of the given UE, wherein the member update message includes an individual identification of each other UE that is currently participating in the communication session; and
    transmitting the member update message to the server mediating the communication session for delivery to each other UE currently participating in the communication session based on each other UE's respective individual identification contained in the member update message without relying upon the server to track which UEs are currently participating in the communication session.

2. The method of claim 1, wherein the suppressed participation level of the given UE is characterized by a user of the given UE ignoring the communication session until one or more trigger conditions are satisfied.

3. The method of claim 2,
    wherein the determining step is based on the user of the given UE being uninterested in a current topic of discussion in the communication session, and
    wherein the one or more trigger conditions include a transition of the communication session back to a topic that is of interest to the user of the given UE.

4. The method of claim 2, wherein the one or more trigger conditions includes the user requesting resumption of a full-participation level in the communication session.

5. The method of claim 2, further comprising:
    detecting that at least one of the one or more trigger conditions are satisfied; and
    resuming a full-participation level in the communication session responsive to the detection.

6. The method of claim 2, wherein at least one of the one or more trigger conditions is configured to be satisfied based on an evaluation of content of media received from one or more other UEs participating in the communication session while the given UE is operating at the suppressed participation level.

7. The method of claim 1,
    wherein the given UE continues to receive and monitor media in association with the communication session while operating at the suppressed participation level,
    wherein the given UE does not transmit media in association with the communication session while operating at the suppressed participation level.

8. The method of claim 1, wherein the suppressed participation level of the given UE is characterized by the given UE receiving and monitoring media in association with the communication session from a first set of other UEs currently participating in the communication session and the given UE ignoring or discouraging media in association with the communication session from a second set of other UEs currently participating in the communication session.

9. The method of claim 8, wherein the first set includes UEs of more relevance or importance to the given UE as compared to the second set.

10. The method of claim 8, wherein media received from one or more UEs in the second set while the given UE is operating at the suppressed participation level is ignored or dropped by the given UE.

11. The method of claim 8, wherein the transmitted member update message is configured to request that UEs in the second set refrain from transmitting media to the given UE in association with the communication session.

12. The method of claim 1,
wherein the suppressed participation level of the given UE is characterized by the given UE receiving and monitoring media from one or more other UEs currently participating in the communication session, and
wherein the given UE suppresses presentation of the received and monitored media to a user of the given UE while the given UE is operating at the suppressed participation level.

13. The method of claim 1, wherein the member update message includes the list of UEs that are currently participating in the communication session including the given UE.

14. The method of claim 1, further comprising:
receiving, from another UE in the communication session, a member update message indicating that at least one new UE has joined the communication session,
wherein the maintaining step adds the at least one new UE to the list of UEs in response to the received member update message.

15. The method of claim 1, further comprising:
determining, at the given UE, to add at least one UE to the communication session;
configuring another member update message to include the communication session identifier and to indicate that the at least one UE has joined the communication session; and
transmitting the another member update message to each other UE currently participating in the communication session.

16. The method of claim 1, wherein the communication session is established such that a subset of the UEs currently participating in the communication session are permitted to modify a given set of control parameters associated with the communication session.

17. The method of claim 16, wherein the given set of control parameters that can be modified by the subset of UEs include one or more of (i) a group membership of the communication session by adding and/or removing UEs, (ii) a given participation level of the UEs participating in the communication session, (iii) a name of a group of UEs participating in the communication session, (iv) avatars used by the UEs participating in the communication session and/or a combination thereof.

18. The method of claim 16, wherein the given set of control parameters that can be modified by the subset of UEs includes a group membership of the communication session such that only the subset of UEs can add new UEs to the communication session.

19. The method of claim 18, further comprising:
receiving, from another UE in the communication session, a member update message indicating that at least one new UE has joined the communication session,
wherein the another UE belongs to the subset of UEs that are permitted to add other UEs to the communication session, and
wherein the maintaining step adds the at least one new UE to the list of UEs in response to the received member update message.

20. The method of claim 18, further comprising:
receiving a request, at the given UE, to add at least one UE to the communication session;
determining whether the given UE belongs to the subset of UEs that are permitted to add UEs to the communication session;
if the given UE is determined to belong to the subset of UEs, configuring another member update message to include the communication session identifier and to indicate that the at least one UE has joined the communication session and transmitting the another member update message to each other UE currently participating in the communication session; and
if the given UE is determined not to belong to the subset of UEs, denying the received request.

21. The method of claim 18, wherein the subset of UEs includes a single UE.

22. The method of claim 18, wherein the subset of UEs includes multiple UEs.

23. The method of claim 22, wherein the subset of UEs includes less than all of the UEs that are currently participating in the communication session.

24. The method of claim 1, further comprising:
receiving, from another UE in the communication session, a member update message indicating that at least one UE has dropped out of the communication session,
wherein the maintaining step removes the at least one UE from the list of UEs in response to the received member update message.

25. The method of claim 24, wherein the at least one UE includes the another UE.

26. The method of claim 1, further comprising:
determining, at the given UE, to drop out of the communication session;
configuring another member update message to include the communication session identifier and to indicate that the given UE has dropped out of the communication session; and
transmitting the another member update message to each other UE currently participating in the communication session.

27. The method of claim 1, further comprising:
losing a connection between the given UE and the server mediating the communication session;
regaining the connection between the given UE and the server at some later point in time; and
upon regaining the connection, receiving at least one member update message from the server that was stored by the server during the given UE's period of disconnection.

28. The method of claim 27, wherein the at least one member update message corresponds to each member update message that was stored by the server during the given UE's period of disconnection.

29. The method of claim 27, wherein the at least one member update message corresponds to a most recent member update message that was stored by the server during the given UE's period of disconnection.

30. The method of claim 1, wherein the transmitting transmits each member update message as a UE-to-UE in-call signaling message that passes through the server mediating the communication session.

31. The method of claim 1,
wherein two or more other UEs are participating in the communication session during the determining, configuring and transmitting steps,
wherein the member update message includes individual identifications of the two or more other UEs.

32. A method of participating in a communication session that is mediated by a server, comprising:
maintaining, at a given user equipment (UE) participating in the communication session, an identifier associated with the communication session and a list of UEs that are currently participating in the communication session;
receiving, at the given UE, a request to modify one or more of a given set of control parameters associated with the communication session;
determining that the given UE belongs to a subset of UEs that are currently participating in the communication session and to which permission to modify the given set of control parameters is restricted;
granting the received request based on the determination by configuring a member update message to facilitate the requested modification to the one or more of the given set of control parameters, wherein the member update message includes an individual identification of each other UE that is currently participating in the communication session; and
transmitting the member update message to the server mediating the communication session for delivery to each other UE currently participating in the communication session based on each other UE's respective individual identification contained in the member update message without relying upon the server to track which UEs are currently participating in the communication session.

33. The method of claim 32, wherein the given set of control parameters that can be modified by the subset of UEs include one or more of (i) a group membership of the communication session by adding and/or removing UEs, (ii) a participation level of the UEs participating in the communication session, (iii) a name of a group of UEs participating in the communication session, (iv) avatars used by the UEs participating in the communication session and/or a combination thereof.

34. The method of claim 32,
wherein if the determining step alternatively determines that the given UE does not belong to the subset of UEs, the received request would be denied.

35. The method of claim 32, wherein the given set of control parameters that can be modified by the subset of UEs include a group membership of the communication session such that only the subset of UEs can add new UEs to the communication session.

36. The method of claim 35, further comprising:
receiving, from another UE in the communication session, a member update message indicating that at least one new UE has joined the communication session,
wherein the another UE belongs to the subset of UEs that are permitted to add other UEs to the communication session, and
wherein the maintaining step adds the at least one new UE to the list of UEs in response to the received member update message.

37. The method of claim 32, wherein the subset of UEs includes a single UE.

38. The method of claim 32, wherein the subset of UEs includes multiple UEs.

39. The method of claim 38, wherein the subset of UEs includes less than all of the UEs that are currently participating in the communication session.

40. The method of claim 32, further comprising:
losing a connection between the given UE and the server mediating the communication session;
regaining the connection between the given UE and the server at some later point in time; and
upon regaining the connection, receiving at least one member update message from the server that was stored by the server during the given UE's period of disconnection.

41. The method of claim 40, wherein the at least one member update message corresponds to each member update message that was stored by the server during the given UE's period of disconnection.

42. The method of claim 40, wherein the at least one member update message corresponds to a most recent member update message that was stored by the server during the given UE's period of disconnection.

43. The method of claim 32, wherein the transmitting transmits each member update message as a UE-to-UE in-call signaling message that passes through the server mediating the communication session.

44. A user equipment (UE) configured to manage group state information associated with a communication session that is mediated by a server, comprising:
means for maintaining an identifier associated with the communication session and a list of UEs that are currently participating in the communication session;
means for determining to suppress a participation level of the UE in the communication session;
means for configuring a member update message to include the communication session identifier and to indicate the suppressed participation level of the UE, wherein the member update message includes an individual identification of each other UE that is currently participating in the communication session; and
means for transmitting the member update message to the server mediating the communication session for delivery to each other UE currently participating in the communication session based on each other UE's respective individual identification contained in the member update message without relying upon the server to track which UEs are currently participating in the communication session.

45. A user equipment (UE) configured to participate in a communication session that is mediated by a server, comprising:
means for maintaining an identifier associated with the communication session and a list of UEs that are currently participating in the communication session;
means for receiving a request to modify one or more of a given set of control parameters associated with the communication session;
means for determining that the UE belongs to a subset of UEs that are currently participating in the communication session and to which permission to modify the given set of control parameters is restricted;
means for granting the received request based on the determination by configuring a member update message to facilitate the requested modification to the one or more of the given set of control parameters, wherein the member update message includes an individual identification of each other UE that is currently participating in the communication session; and means for transmitting the member update message to the server mediating the communication session for delivery to each other UE currently participating in the communication session based on each other UE's respective individual identification contained in the member update message without relying upon the server to track which UEs are currently participating in the communication session.

46. A user equipment (UE) configured to manage group state information associated with a communication session that is mediated by a server, comprising:

logic configured to maintain an identifier associated with the communication session and a list of UEs that are currently participating in the communication session;

logic configured to determine to suppress a participation level of the UE in the communication session;

logic configured to configure a member update message to include the communication session identifier and to indicate the suppressed participation level of the UE, wherein the member update message includes an individual identification of each other UE that is currently participating in the communication session; and logic configured to transmit the member update message to the server mediating the communication session for delivery to each other UE currently participating in the communication session based on each other UE's respective individual identification contained in the member update message without relying upon the server to track which UEs are currently participating in the communication session.

47. A user equipment (UE) configured to participate in a communication session that is mediated by a server, comprising:

logic configured to maintain an identifier associated with the communication session and a list of UEs that are currently participating in the communication session;

logic configured to receive a request to modify one or more of a given set of control parameters associated with the communication session;

logic configured to determine that the UE belongs to a subset of UEs that are currently participating in the communication session and to which permission to modify the given set of control parameters is restricted;

logic configured to grant the received request based on the determination by configuring a member update message to facilitate the requested modification to the one or more of the given set of control parameters, wherein the member update message includes an individual identification of each other UE that is currently participating in the communication session; and logic configured to transmit the member update message to the server mediating the communication session for delivery to each other UE currently participating in the communication session based on each other UE's respective individual identification contained in the member update message without relying upon the server to track which UEs are currently participating in the communication session.

48. A non-transitory computer-readable medium containing instructions stored thereon, which, when executed by a user equipment (UE) configured to manage group state information associated with a communication session that is mediated by a server, cause the UE to perform operations, the instructions comprising:

program code to maintain an identifier associated with the communication session and a list of UEs that are currently participating in the communication session;

program code to determine to suppress a participation level of the UE in the communication session;

program code to configure a member update message to include the communication session identifier and to indicate the suppressed participation level of the UE, wherein the member update message includes an individual identification of each other UE that is currently participating in the communication session; and program code to transmit the member update message to the server mediating the communication session for delivery to each other UE currently participating in the communication session based on each other UE's respective individual identification contained in the member update message without relying upon the server to track which UEs are currently participating in the communication session.

49. A non-transitory computer-readable medium containing instructions stored thereon, which, when executed by a user equipment (UE) configured to participate in a communication session that is mediated by a server, cause the UE to perform operations, the instructions comprising:

program code to maintain an identifier associated with the communication session and a list of UEs that are currently participating in the communication session;

program code to receive a request to modify one or more of a given set of control parameters associated with the communication session;

program code to determine that the UE belongs to a subset of UEs that are currently participating in the communication session and to which permission to modify the given set of control parameters is restricted;

program code to grant the received request based on the determination by configuring a member update message to facilitate the requested modification to the one or more of the given set of control parameters, wherein the member update message includes an individual identification of each other UE that is currently participating in the communication session; and program code to transmit the member update message to the server mediating the communication session for delivery to each other UE currently participating in the communication session based on each other UE's respective individual identification contained in the member update message without relying upon the server to track which UEs are currently participating in the communication session.

* * * * *